United States Patent
Seki

(10) Patent No.: US 8,004,715 B2
(45) Date of Patent: Aug. 23, 2011

(54) IMAGE FORMING APPARATUS AND METHOD MITIGATING EFFECTS OF PIXEL CORRECTION WHILE COMPENSATION FOR SHIFT IN SCANNING POSITION

(75) Inventor: Hirotaka Seki, Tokyo (JP)

(73) Assignee: Canon Kabushiki Kaisha (JP)

( * ) Notice: Subject to any disclaimer, the term of this patent is extended or adjusted under 35 U.S.C. 154(b) by 626 days.

(21) Appl. No.: 12/169,945

(22) Filed: Jul. 9, 2008

(65) Prior Publication Data

US 2009/0015881 A1    Jan. 15, 2009

(30) Foreign Application Priority Data

Jul. 10, 2007  (JP) .................................. 2007-181443

(51) Int. Cl.
- H04N 1/047  (2006.01)
- H04N 1/053  (2006.01)
- H04N 1/50   (2006.01)
- H04N 1/58   (2006.01)
- H04N 1/29   (2006.01)
- G06K 15/14  (2006.01)

(52) U.S. Cl. ........ 358/1.7; 358/3.26; 358/501; 358/504; 358/525

(58) Field of Classification Search .................... 385/1.7, 385/3.26, 501, 504, 525, 530, 540, 401, 300; 347/129, 132, 225, 237, 247; 399/31, 32, 399/38, 51

See application file for complete search history.

(56) References Cited

U.S. PATENT DOCUMENTS

| | | | |
|---|---|---|---|
| 2009/0034004 A1* | 2/2009 | Nakamura | 358/3.03 |
| 2009/0034007 A1* | 2/2009 | Sano et al. | 358/3.13 |
| 2009/0034029 A1* | 2/2009 | Nakamura | 358/505 |
| 2009/0034034 A1* | 2/2009 | Ido | 358/525 |
| 2009/0059323 A1* | 3/2009 | Ido | 358/525 |

FOREIGN PATENT DOCUMENTS

| | | |
|---|---|---|
| JP | 2-50176 A | 2/1990 |
| JP | 2003-276235 A | 9/2003 |
| JP | 2005-96351 A | 4/2005 |
| JP | 2005-304011 A | 10/2005 |

* cited by examiner

Primary Examiner — Scott A Rogers

(74) Attorney, Agent, or Firm — Rossi, Kimms & McDowell LLP

(57) ABSTRACT

An image forming apparatus has a scanning unit capable of forming a plurality of lines of an image simultaneously by scanning, in a main scanning direction, laser beam that has been emitted from a plurality of laser emitting devices. The apparatus has a memory for storing an error characteristic, in a sub-scanning direction with respect to an ideal scanning line in the main scanning direction, of a scanning line scanned by the scanning unit. A line on which image data is read out is changed over in accordance with a line changeover position in the main scanning direction based upon the error characteristic and a revised pixel position in the main scanning direction in the image data.

10 Claims, 10 Drawing Sheets

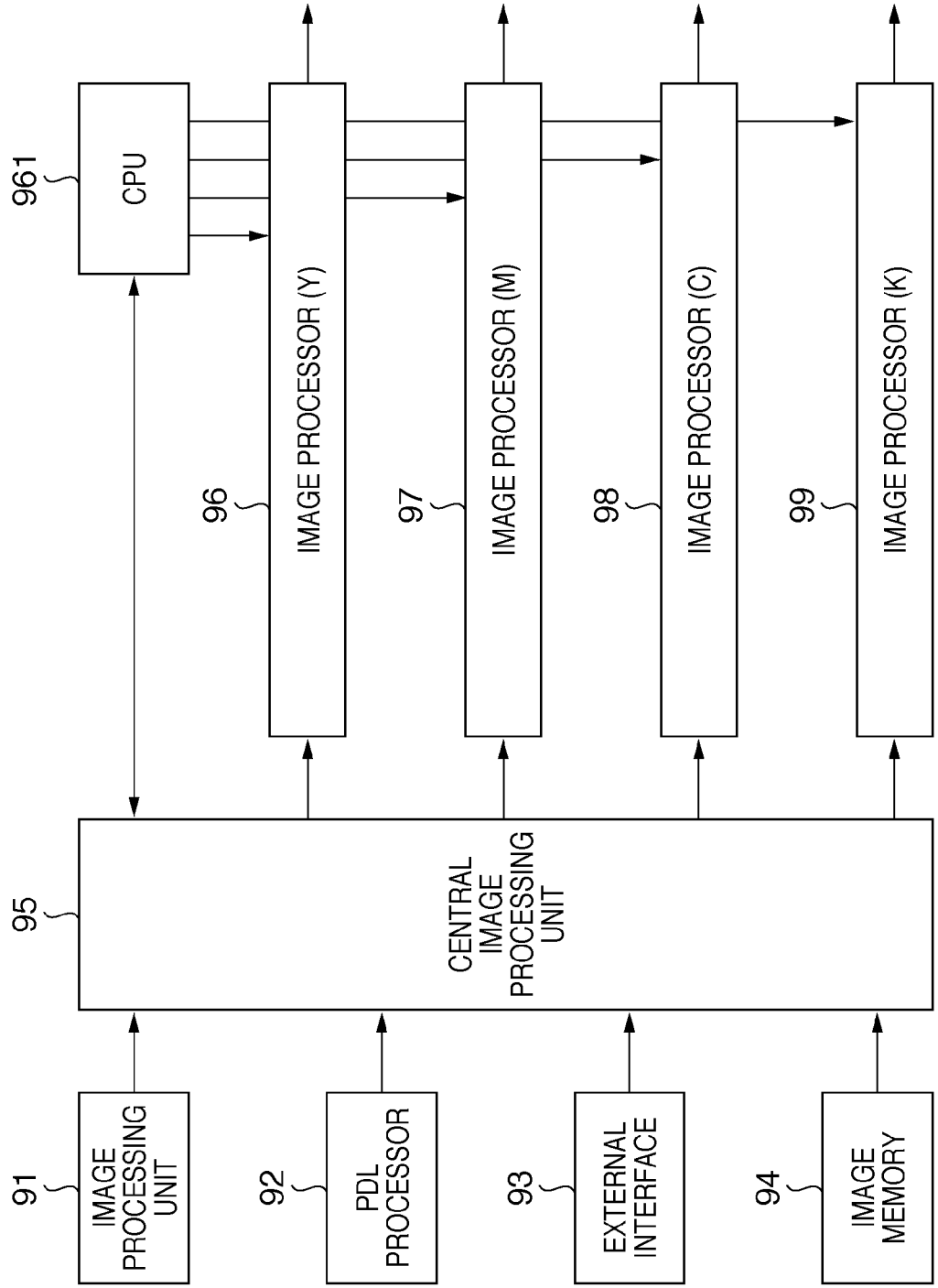

IMAGE FORMING APPARATUS AND METHOD MITIGATING EFFECTS OF PIXEL CORRECTION WHILE COMPENSATION FOR SHIFT IN SCANNING POSITION

BACKGROUND OF THE INVENTION

1. Field of the Invention

The present invention relates to an image forming apparatus for forming an image by an electrophotographic method and to a method of controlling this apparatus.

2. Description of the Related Art

Digital multifunction peripherals that can be utilized as a copier, printer and facsimile machine have become widespread. In the case of low-end products of this type in particular, there is a tendency to assign greater importance to the conserving of space. In order to achieve space savings, use is made of a oblique incidence method in which laser beam diagonally enters a reflecting surface of a polygonal mirror obliquely.

FIG. 4 is a diagram useful in describing the oblique incidence method.

As shown in FIG. 4, laser beam emitted from a laser emitting device 400 is reflected by a polygonal mirror 401 and is scanned across a photosensitive drum 402 to thereby form an electrostatic latent image on the surface of the photosensitive drum 402. The scanning surface of the polygonal mirror 401 for scanning the laser beam is placed at a height different from that of the laser emitting device 400 so that the laser beam diagonally enters a reflecting surface of a polygonal mirror obliquely.

In this method, the distances a, b from the center of the polygonal mirror to the center and edge, respectively, of the scanning surface that reflects the laser beam are different from each other. The difference between these distances appears as an offset in the height direction at the surface of the photosensitive drum 402.

FIG. 3 is a diagram useful in describing a displacement in laser exposure position on a photosensitive drum ascribable to a difference in position on the scanning surface of the polygonal mirror that reflects the laser beam in the above-described oblique incidence method.

A dotted line 300 in FIG. 3 indicates the ideal scanning path of the laser beam. A solid line 301, on the other hand, indicates a scanning path ascribable to the influence of the above-mentioned variation along the height direction.

In order to cancel out this variation in the laser path along the height direction in the oblique incidence method, a correcting lens is placed on the scanning path of the laser beam, thereby canceling out the amount of fluctuation to realize a high image quality. However, machining of the correcting lens, assuring the precision of the lens and the fact that an adjustment process for maintaining the optical system in the desired state takes time all have an influence upon manufacturing cost. Further, a variation along the height direction can occur not only in the oblique incidence method but even in a system in which the laser beam enters upon the axis of rotation of the polygonal mirror perpendicularly.

FIGS. 7A and 7B are diagrams describing such occurrence of a variation in the laser path along the height direction at the surface of a photosensitive drum. It should be noted that portions in FIGS. 7A, 7B similar to those shown in FIG. 4 are designated by like reference characters.

FIG. 7A illustrates an ideal optical system. Here the photosensitive surface of the photosensitive drum 402 is irradiated at a constant height irrespective of distance from the axis of rotation of the polygonal mirror 401 to the surface thereof.

FIG. 7B, which illustrates an extreme case in order to facilitate understanding, shows how the axis of rotation of the polygonal mirror 401 incorporates a mounting error. In this case, in a manner similar to that of the oblique incidence method, a variation in height occurs at the surface of the photosensitive drum 402 owing to the scanning position of the laser beam. This affects image quality. Such error is a problem even in high-end models.

A digital correcting method has been proposed as a technique for dealing with curvature of laser scanning on the surface of a photosensitive drum.

FIG. 5 is a diagram useful in describing this correcting method.

The dotted line indicates an ideal scanning path on a photosensitive drum. Solid lines 500 to 502 indicate actual scanning paths that pass within ±0.5 line of the ideal scanning path indicated by the dotted line. In the vicinity of both ends of the scanning lines, the solid line 500 comes closest to the ideal scanning path. In the vicinity of the center, on the other hand, the solid line 502 comes closest to the ideal scanning path. Accordingly, the area scanned by the laser beam is divided into areas A, B and C, the laser beam is changed over in the following manner: solid line 500 (area A)→solid line 501 (area B)→solid line 502 (area C)→solid line 501 (area B)→solid line 500 (area A), whereby the position of the scanning line formed on the photosensitive drum is made to approach the ideal scanning line. This method is described in Japanese Patent Application Laid-Open Nos. 02-050176, 2005-304011 and 2003-276235.

In this case, the position of each solid line and the ideal scanning path do not coincide at all. The pixel data that is output at each scanning position therefore is not output as is as line data but is output as interpolation data obtained by interpolation between adjacent-line data. Such shifting of line data by interpolation in the sub-scanning direction is a technique having a high level of difficulty. In a low-cost product in particular, uniformity of the thickness of fine lines tends to be lost in view of the poor tone reproduction of very small dots.

FIGS. 6A to 6D are diagrams describing this situation.

In FIGS. 6A to 6D, each square indicates one dot formed by PWM (Pulse-Width Modulation). FIG. 6A illustrates an ideal fine line having a width of one dot. FIG. 6B shows an example of changeover of line data and a correction in which interpolation processing is not carried out. In the case of FIG. 6B, the fine line is one in which jaggies appear conspicuously at portion where the line data is changed over. FIG. 6C illustrates a case scanning curvature has been corrected by interpolation. Here the portions where the line data has been changed over by interpolation of the central portion become thick, and therefore it is difficult to reproduce thickness uniformly. For this reason, a technique has been proposed in which the range of a correction by interpolation at a portion where line data has been changed over is made the smallest possible interval, as illustrated in FIG. 6D, thereby obtaining an image in which the thickness of a fine line is made uniform without producing jaggies. In FIGS. 6A to 6D, the width of each square corresponds to the pulse width of a PWM signal.

When a color image is formed, generally images of a plurality of colors such as cyan, magenta, yellow and black are superimposed. However, the scanning paths of the beam that forms each of the images of the plurality of colors are different from one another. This means that in a case where processing is executed for outputting image data for forming dots of each color on the ideal scanning line, the changeover point of the line data is different for every item of data of each color. Owing to the fact that the changeover point of the line data thus differs for each item of image data of the plurality of colors, a color shift and color unevenness become conspicuous in the vicinity of the changeover points of the line data.

An increase in the speed of image formation in recent years has been accompanied by use of a laser system in which exposure is performed by arraying a plurality of lasers in the sub-scanning direction. In this case also where use is made of such lasers, it is required that the optical-path lengths from the laser emitting source to the surface of the photosensitive member along the main scanning direction be equalized and, at the same time, it is required that the scan length between the lasers arrayed in the sub-scanning direction and the photosensitive member also be equalized. Correction of the scan length depends upon an optical correction, which uses an f-θ lens, and mechanical precision. However, since such a correction requires a high degree of precision in terms of lens manufacture, it is a cause of higher cost.

Further, owing to improvements in the resolution of image formation, a difference in the optical-path lengths of multiple lasers that was allowed in the past has now come to have an effect upon the output image and can no longer be ignored. Further, in an image forming apparatus having a plurality of photosensitive members, a structure for adjusting scanning magnification on each photosensitive member is quite complex and adjustments are necessary. This leads to an increase in cost. Accordingly, a technique for revising an inappropriate scanning position on the photosensitive member by manipulating the laser beam lighting pattern has been proposed (see Japanese Patent Application Laid-Open No. 2005-96351).

However, if a revision of the scanning position on a photosensitive member is performed in an interval where a correction based upon pixel interpolation in the sub-scanning direction is applied in the vicinity of the changeover point of line data, the thickness of fine lines becomes uneven and the density of the image formed becomes non-uniform. This leads to a decline in image quality.

In image formation based upon image data, it is necessary to execute image scaling processing, namely adding on pixel data or deleting pixels in accordance with the size of the image formed and the volume (resolution) of image data. In a case where an image is formed using the above-described image forming apparatus based upon image data that has been subjected to such scaling processing, processing that changes over the line data for correcting the deviation between the actual scanning position of the laser beam and the ideal scanning position, in the manner described above, is similarly required. It should be noted that if pixel data added on anew or deleted pixel data exists at the line-data changeover position, then interpolation processing at the portion where the line data changes over is executed. However, pixel data added on or pixel data deleted is pixel data that did not exist in the original image data. If processing that is based upon pixel data of a position that did not originally exist or from which a pixel was removed is executed, then this will invite a decline in image quality.

SUMMARY OF THE INVENTION

An aspect of the present invention is to solve the above-mentioned problems of the prior art.

An aspect of the present invention it to provide an image forming apparatus capable of forming a high-quality image by mitigating effects that accompany a correction of pixel data, while applying a revision for a shift in scanning position, as well as a method of controlling this apparatus.

According to an aspect of the present invention, there is provided an image forming apparatus comprising: a scanning unit configured to be operable to simultaneously scan a plurality of lines of an image in a main scanning direction to thereby form an image of the plurality of lines; a characteristic storage unit configured to store an error characteristic, in a sub-scanning direction with respect to an ideal scanning line, of a scanning line of the scanning unit in a main scanning direction thereof; a storage unit configured to store a plurality of lines of image data; a line selector configured to select a line of image data that is read out of the storage unit; an interpolation unit configured to interpolate the image data of the line, which has been selected by the line selector and read out, in accordance with the error characteristic stored in the characteristic storage unit; a unit configured to store a revised pixel position in the main scanning direction in the image data; and a changeover control unit configured to change over the line of image data, which is selected by the line selector, in accordance with a scanning line changeover position in the main scanning direction, which is based upon the error characteristic stored in the characteristic storage unit, and the revised pixel position.

According to an aspect of the present invention, there is provided a method of controlling an image forming apparatus having a scanning unit configured to be operable to simultaneously scan a plurality of lines of an image in a main scanning direction to thereby form an image of the plurality of lines and a characteristic storage unit for storing an error characteristic, in a sub-scanning direction with respect to an ideal scanning line, of a scanning line of the scanning unit in the main scanning direction thereof, the method comprising: a line selecting step of selecting a line of image data that is read out of a memory that stores a plurality of lines of image data; an interpolation step of interpolating the image data of the line, which has been selected and read out in the line selecting step, in accordance with the error characteristic; a storage step of storing a revised pixel position in the main scanning direction in the image data; and a step of determining a scanning line changeover position changing over the line of image data in the main scanning direction, based on the error characteristic stored in the characteristic storage unit; a changeover control unit step of changing over the line of image data, which is selected in the line selecting step, in accordance with the scanning line changeover position and the revised pixel position.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a function block diagram describing the functional configuration of a color copier according to this embodiment;

FIGS. 12A and 12B are diagrams illustrating the structure of a laser scanner unit according to this embodiment, in which FIG. 12A depicts a view as seen from the side and FIG. 12B depicts a view as seen from above.

DESCRIPTION OF THE EMBODIMENTS

Numerous embodiments of the present invention will now be described in detail with reference to the accompanying drawings. The following embodiments are not intended to limit the claims of the present invention.

This embodiment will be described with regard to a case where the present invention is applied to a 4-drum type of color copying machine in which four photosensitive drums are arrayed in tandem.

Figure 2:
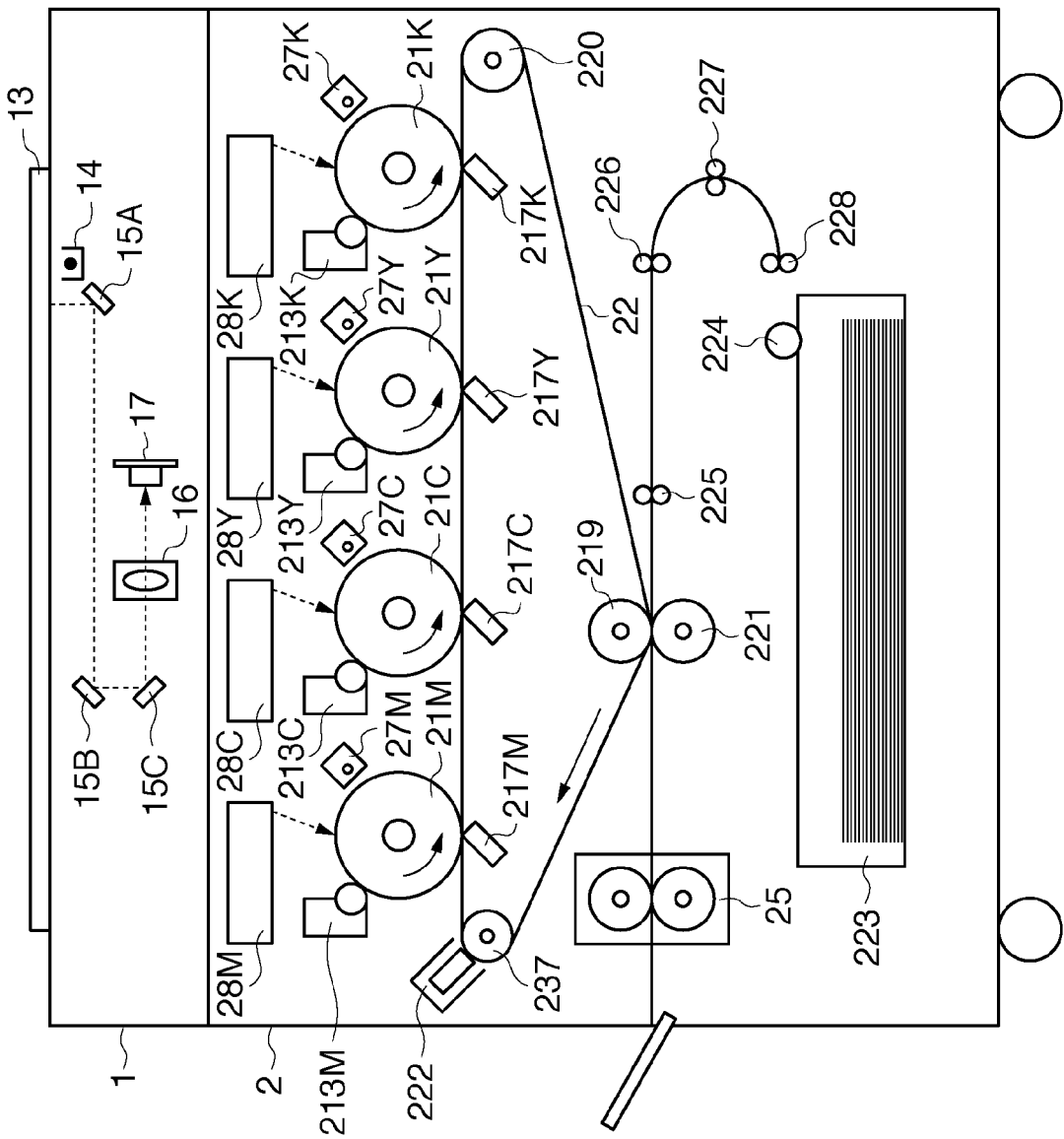
FIG. 2 is a diagram illustrating the configuration of a color copier according to the embodiment of the present invention.

FIG. 2 is a diagram illustrating the configuration of a color copier according to an exemplary embodiment of the present invention.

A color image reader (referred to as a "color scanner" below) 1 and a color image printing unit (referred to as a "color printer" below) 2 that construct this color copier will be described.

The color scanner 1 forms the image of an original 13 on a color image sensor 17 via a lamp 14, a group of mirrors 15A, 15B and 15C and a lens 16, reads color image information representing the original 13 per separated colors R, G, B and converts the results into an electrical image signal. A color conversion is performed by an image processing unit (not shown) based upon the intensity level of the color-separated image signal of each of R, G, B obtained by the color scanner 1, whereby black (Bk), cyan (C), magenta (M) and yellow (Y) color image data is obtained.

The color printer 2 will be described next. In the color printer 2, the color image data from the color scanner 1 is converted to a light signal by laser irradiation units 28M (for magenta), 28C (for cyan), 28Y (for yellow) and 28K (for black) provided for respective ones of toners of four colors. Electrostatic latent images corresponding to the image of the original 13 are respectively formed on photosensitive members 21M (for magenta), 21C (for cyan), 21Y (for yellow) and 21K (for black), which are provided for respective ones of the colors, by the light signal thus obtained by the conversion. Each of the photosensitive members 21M, 21C, 21Y, 21K rotates in the direction of the arrow. A charger 27M (for magenta), 27C (for cyan), 27Y (for yellow), 27K (for black) and an M developer 213M, C developer 213C, Y developer 213Y, Bk developer 213K are disposed around respective ones of the photosensitive members 21M, 21C, 21Y, 21K. An intermediate transfer belt 22 serving as an intermediate transfer is provided as well as primary transfer bias blades 217M (for magenta), 217C (for cyan), 217Y (for yellow) and 217K (for black) for respective ones of the colors. The intermediate transfer belt 22 is tensioned by and runs on a driving roller 220, which is rotatively driven by a driving motor (not shown), and driven rollers 219 and 237.

The images corresponding to the colors thus formed by the photosensitive members 21M, 21C, 21Y, 21K are successively transferred (primary transfer) to the intermediate transfer belt 22 where the images are superimposed, whereby a color image is formed on the intermediate transfer belt 22. The image thus formed on the intermediate transfer belt 22 is transferred (secondary transfer) to a sheet (printing medium) by a secondary transfer bias roller 221, whereby an image is formed.

It should be noted that each developer is constituted by a developing sleeve that rotates to bring the crest of a developing agent (toner) into contact with the surface of the photosensitive member in order to develop the electrostatic latent image, and a developing paddle that rotates in order to draw in and stir the developing agent.

Further, the secondary transfer bias roller 221 is placed at a position opposing the driven roller 219 of the intermediate transfer belt 22 and is provided with a mechanism (not shown) driven so that it can bring the secondary transfer bias roller 221 into and out of contact with the intermediate transfer belt 22.

Further, a belt cleaning unit 222 is provided at the surface of the intermediate transfer belt 22 at a position opposing the driven roller 237. The operation timing at which the belt cleaning unit 222 makes and breaks contact with the belt 22 is such that the belt cleaning unit 222 is spaced away from the belt 22 from the start of printing until the end of transfer of the trailing edge of the image of the final color from the belt. Then, at a prescribed timing thereafter, the belt cleaning unit 222 is contacted with the belt 22 by the above-mentioned mechanism (not shown) to perform cleaning by removing toner (developing agent) remaining on the belt 22 because it has not been transferred.

Image formation processing in the color printer 2 will be described next. First, image formation starts from magenta for which the photosensitive member 21M is situated farthest upstream. Thereafter, image formation of the next color cyan starts at a timing delayed by an amount commensurate with the distance between the photosensitive members 21M and 21C and in conformity with the speed at which the intermediate transfer belt 22 circulates. Thereafter, and in similar fashion, image formation of the succeeding color images is executed at a time difference conforming to the speed at which the intermediate transfer belt 22 circulates and the distance between mutually adjacent photosensitive members.

The image data of each color is processed by the image processing unit and the images are optically written by the laser beam to respective ones of the photosensitive members 21M, 21C, 21Y, 21K, which have been uniformly charged, based upon the image data. Irradiation with the laser beam is performed by the laser irradiation units 28M, 28C, 28Y, 28K corresponding to the respective colors, and electrostatic images corresponding to the respective colors are thus formed successively on the corresponding photosensitive members. Image formation for the color magenta will be described below as a typical example of the 4-drum type of system.

When exposure of the photosensitive member 21M to the laser beam starts, the developing sleeve of the M developer 213M rotates and a developing bias is applied in order that development will be possible from the leading edge of the M latent image. The operation for developing the M latent image continues and then, when the trailing edge of the latent image passes by the M developing position, development by the M developer 213M is deactivated. The magenta toner image thus formed on the photosensitive member 21M is transferred to the intermediate transfer belt 22 by the first transfer bias blade 217M and is carried on the intermediate transfer belt 22. By successively executing this series of operations by each of the units for the other colors cyan, yellow and black, a full-color toner image formed by images of each of the colors is formed on the intermediate transfer belt 22.

When the full-color toner image is thus formed on the intermediate transfer belt 22, the secondary transfer bias roller 221 is moved by the above-mentioned mechanism to the position where it contacts the intermediate transfer belt 22.

The sheet to which this image is to be transferred is transported from cassette 223 via a feed roller 224 and conveyance rollers 226, 227, 228 and stands by at the position of a registration roller 225. When the secondary transfer bias roller 221 contacts the intermediate transfer belt 22, the registration roller 225 is rotated to feed the sheet to the secondary transfer bias roller 221 in such a manner that the toner image on the intermediate transfer belt 22 is transferred to the prescribed position on the sheet. A prescribed transfer bias is applied to the secondary transfer bias roller 221 in order to transfer the toner image on the intermediate transfer belt 22 to the sheet. As a result, batch transfer of the toner image to the sheet is performed. The sheet to which the toner image has thus been transferred is transported to a fixing unit 25. Here the toner image is fused and fixed by upper and lower fixing rollers controlled to a prescribed temperature, whereby a high-resolution full-color printout is obtained.

Figure 12A:
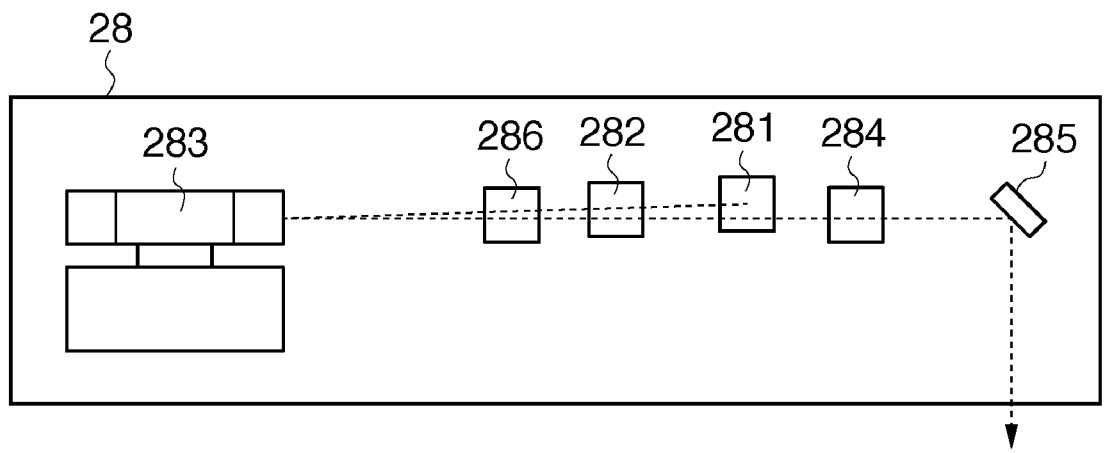
Figure 12B:
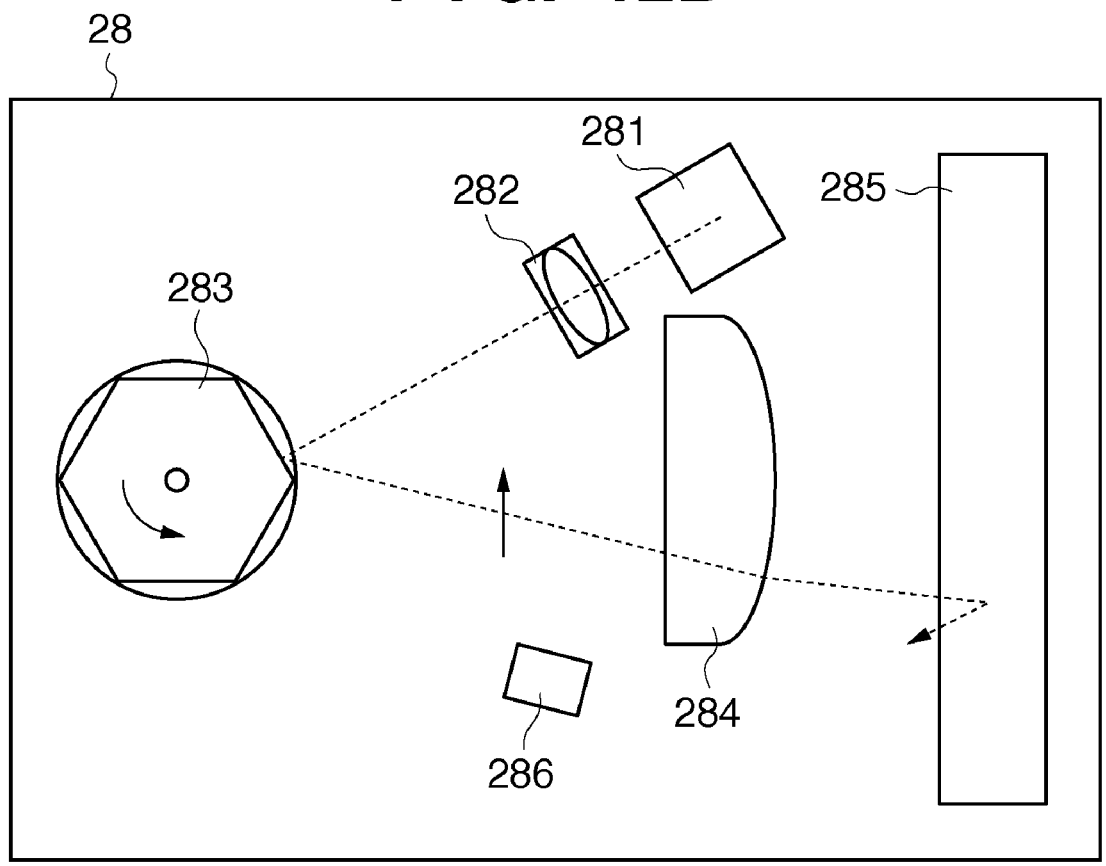

FIGS. 12A, 12B are diagrams illustrating the structure of a laser scanner unit 28 (28M, 28C, 28Y, 28K) according to this embodiment, in which FIG. 12A is a view as seen from the side and FIG. 12B a view as seen from above. Each laser scanner unit 28 is scanned in the main scanning direction and is capable of forming four lines of an image concurrently.

A laser emitting device array 281 has four laser emitting elements in the vertical direction. Four lines can be scanned simultaneously by these laser emitting elements. The laser beams emitted from the laser emitting device array 281 irradiate the faces of a 6-face polygonal mirror 283 through a lens 282. The polygonal mirror 283 is rotatively driven by a polygon motor. The laser beams from the laser emitting device array 281 are deflected so as to be scanned six times on the photosensitive member in one revolution of the mirror. At lease one of the laser beams thus deflected is detected by a BD (Beam Detection) element 286 at the beginning of a scan, and the detection signal (BD signal) serves as a trigger for starting exposure for every main scan.

Meanwhile, exposure-start timing in the sub-scanning direction is obtained in response to a signal from an HP sensor (not shown) provided on the intermediate transfer belt 22. A correction of the scanning speed of the end portion of a scanning line is performed by an f-θ lens 284, the beams are deflected by a planar mirror 285 and the surface of the photosensitive member 21 (21M, 21C, 21Y, 21K in FIG. 2) disposed therebelow is irradiated.

FIG. 8 is a function block diagram describing the functional configuration of the color copier according to this embodiment.

The image signal read by the color scanner 1 is subjected by an image processing unit 91 to image processing such as a shading correction that depends upon the reading device, and the processed signal is delivered to a central image processing unit 95. The central image processing unit 95 stores the image data in an image memory 94, and image signals are delivered to output image processors (referred to simply as image processors below) 96 to 99 at a timing that reflects the distance between the photosensitive members 21M, 21C, 21Y, 21K. The central image processing unit 95 sends and receives data to and from an external device such as a telephone line or network via an external interface 93. In a case where the received data is PDL (Page Description Language) data, a PDL processor 92 expands the PDL data into image information. The image processors 96, 97, 98, 99 apply image processing to the colors Y, M, C, Bk, respectively, thereby executing processing optimum for laser output as well as correction processing.

Figure 1:
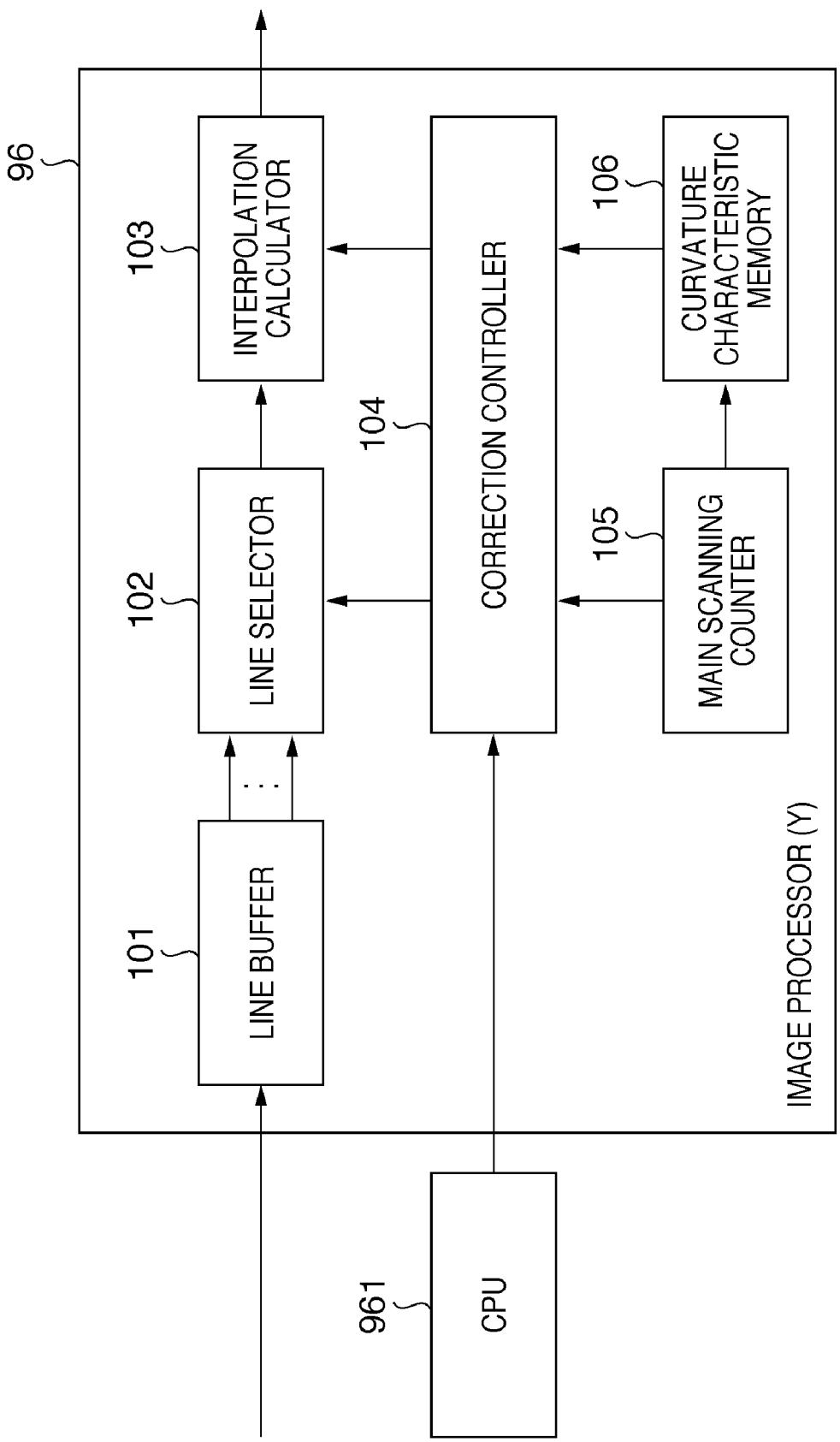
FIG. 1 is a block diagram illustrating the configuration of an image processor according to an exemplary embodiment of the present invention.

FIG. 1 is a block diagram illustrating the configuration of the image processor (96 to 99) according to this embodiment. Since the structures of the image processors 96 to 99 are the same, the image processor 96 for Y will be described. The other image processors 97 to 99 need not be described.

First, in accordance with the image data and image size at which this image data is printed, a CPU 961 inserts pixel data in this image data or deletes (removes) pixel data from this image data to thereby enlarge or reduce the image. At this time the revised pixel positions in the main scanning direction in which pixel data has been added to or removed from the image data is stored.

Line deviation width (deviation between lines 300 and 301 in FIG. 3) in this embodiment is a maximum of 20 lines of image data inclusive of variations in manufacture. Accordingly, a line buffer 101 stores a plurality of lines of image data. Here the number of lines of the maximum conceivable deviation width and the line data for use in interpolation calculation executed at a succeeding stage are held. It is assumed that (20+1) lines of data can be stored. The line data enlarged or reduced as described above is stored in the line buffer 101. The line buffer 101 operates as a FIFO buffer which, whenever one line of data is transferred, discards one line of line data transferred initially and retains the latest (20+1) lines of data. A line selector 102 selects a line of image data that is read out of the line buffer 101. That is, one line of data selected from among all of the line data (21 lines), which is being held by the line buffer 101, in accordance with a command from a correction controller 104 is output to an interpolation calculator 103. The interpolation calculator 103 stores an error characteristic in the sub-scanning direction with respect to an ideal scanning line in the main scanning direction of the laser scanner unit 28. More specifically, the interpolation calculator 103 stores a plurality of lines of line data selected by the line selector 102 and performs a pixel correction calculation between lines based upon a correction value from the correction controller 104. That is, if we let α represent a correction coefficient, interpolated pixel data is obtained by performing the following calculation: (present line of data)×(1−α)+(next line)×α. It should be noted that if the time is prior to a changeover from the first line to the second line, for example, then "next line" pertains to the second line to which the changeover is to be made.

Figure 3:
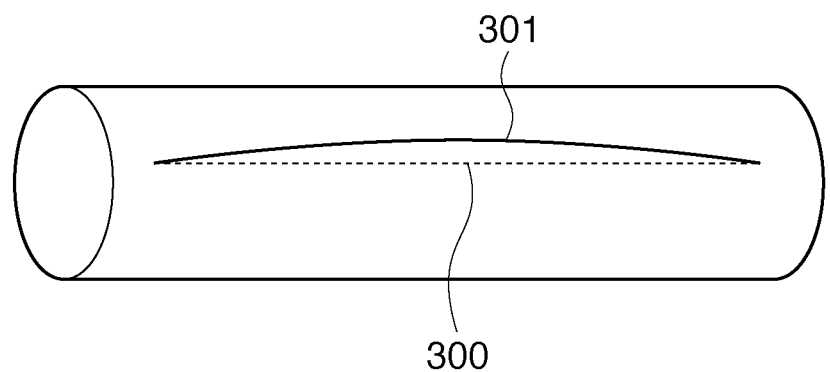
FIG. 3 is a diagram useful in describing a displacement in laser exposure position on a photosensitive drum ascribable to a difference in position on the scanning surface of a polygonal mirror that reflects a laser beam.
Figure 4:
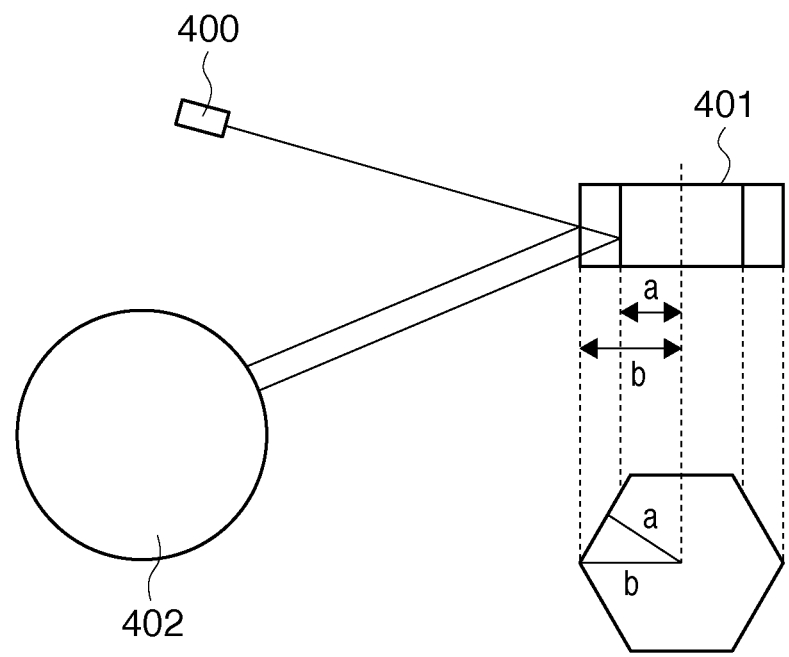
FIG. 4 is a diagram useful in describing the oblique incidence method.
Figure 5:
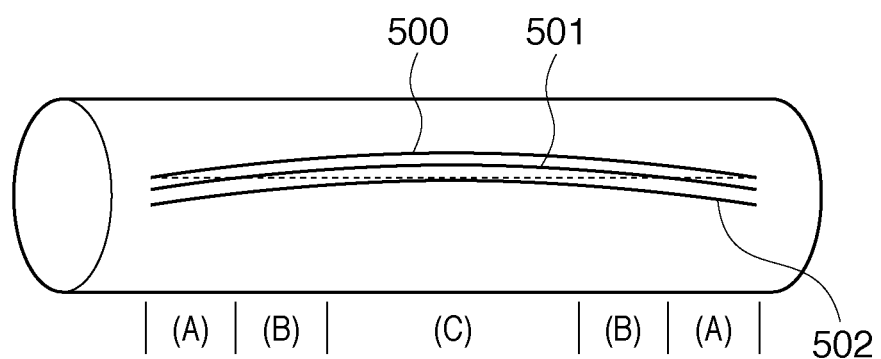
FIG. 5 is a diagram describing a photosensitive member and a method of correcting a scanning path.
Figure 6A:
FIGS. 6A to 6D are diagrams describing correction of precision within one pixel by interpolation processing.
Figure 6B:
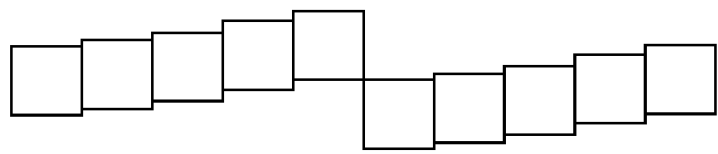
Figure 6C:
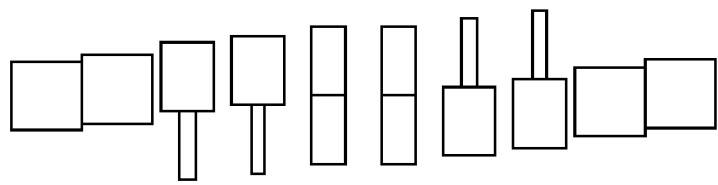
Figure 6D:
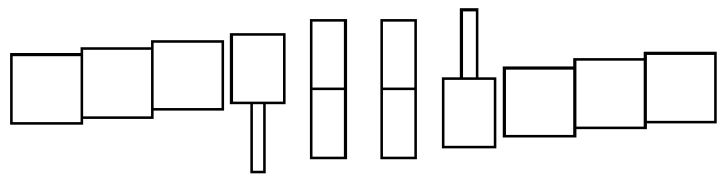
Figure 7A:
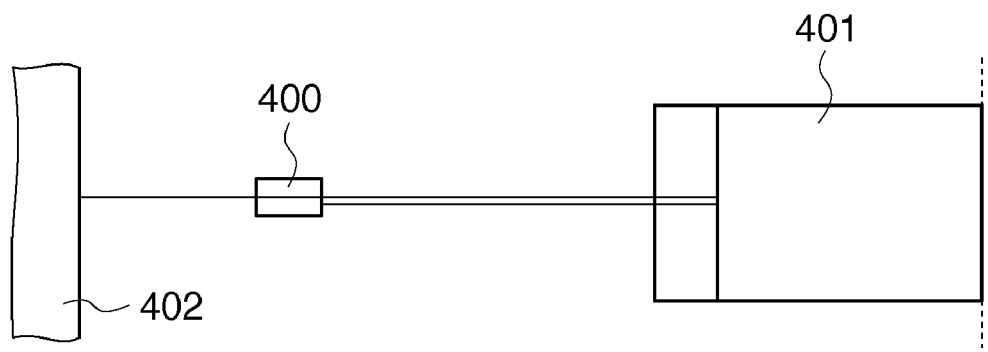
FIGS. 7A and 7B are diagrams describing occurrence of a variation in a laser path along the height direction at the surface of a photosensitive drum.
Figure 7B:
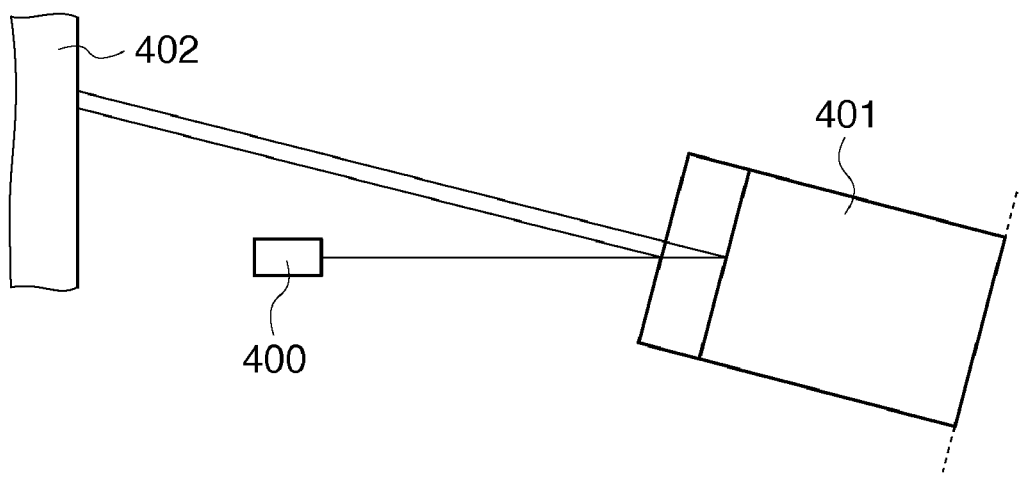

By thus outputting pixel data corresponding to the scanning position of each of the beams from the interpolation calculator 103, it is possible, even in a case where the beam scanning position deviates in the manner shown for example in FIG. 3, to output pixel data corresponding to this beam scanning position (line). As a result, even though the scanning position (line) of each of the beams shifts, a high-quality image that is not susceptible to the effects of this beam shift can be formed.

A main scanning counter 105 is a counter for obtaining a pixel position in the main scanning direction along which the beam is being scanned. A curvature characteristic memory 106 stores an actual beam curvature characteristic (e.g., 301 in FIG. 3), with respect to the ideal scanning path 300 (see FIG. 3), on one main scanning line. This actual beam curvature characteristic is stored in the form of a numerical value that includes an integer part (line position to be corrected) and a decimal part (correction value). Accordingly, if the value in the curvature characteristic memory 106 at the present pixel position is, e.g., "2.6", then the interpolation calculator 103 receives as inputs and holds the second and third lines of image data, which have been selected by the line selector 102, and obtains correction pixel data interpolated between the lines of line data in accordance with the following calculation ($\alpha$=0.6): (second line of pixel data)×(1−0.6)+(third line of pixel data)×0.6.

The correction controller 104 reads out the next correction position and the correction value from the curvature characteristic memory 106. Furthermore, the correction controller 104 accepts a revised pixel position in the main scanning direction sent from the CPU 961 and controls selection of line data by the line selector 102. That is, based upon the output from the main scanning counter 105, the correction controller 104 measures the beam scanning position in one line and then outputs a correction value of each pixel based upon the distance from the correction position, the correction value and the revised pixel position in the main scanning direction that has been received from the CPU 961. Furthermore, the correction controller 104 exercises control as to whether or not the line data is to be changed over or so as to change over the line data before the revised pixel position in the main scanning direction or after the revised pixel position in the main scanning direction.

Figure 9:
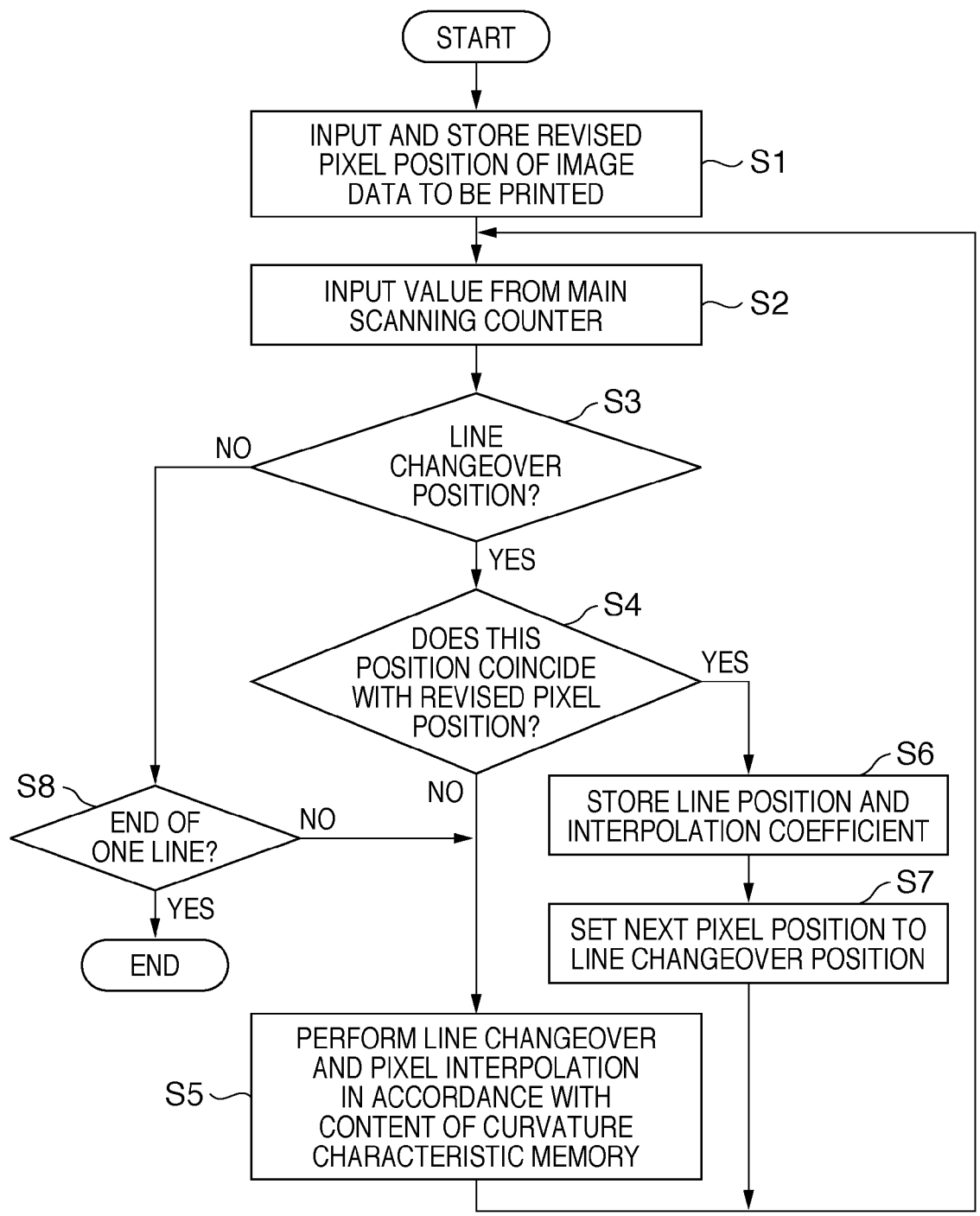
FIG. 9 is a flowchart describing output processing of one line of image data by a correction controller according to this embodiment.

FIG. 9 is a flowchart describing output processing of one line of image data by the correction controller 104 according to this embodiment. Before this processing is executed, the CPU 961 enlarges or reduces the image in accordance with the image data and size to which this image is to be formed. It is assumed that 21 lines of image data from the beginning of the enlarged or reduced image data has been supplied to and is being held in the line buffer 101.

First, in step S1, a revised pixel position of a pixel in this image data is input from the CPU 961 and is stored in the correction controller 104. It should be noted that revised pixel position of this pixel may be stored for every line. If the revised pixel position in each line is common in the entirety of the image data, the input of the revised pixel position need be performed only one time. However, if the revised pixel position differs from line to line, then the revised pixel position should be input and held line by line. Next, in step S2, information indicating the scanning position of the beam is acquired from the main scanning counter 105. Then it is determined in step S3 whether the present scanning position of the beam corresponds to a line changeover position, based upon the correction position that has been stored in the curvature characteristic memory 106. When the present scanning position of the beam corresponds to the line changeover position, control proceeds to step S4, where it is determined whether this position coincides with the revised pixel position. Specifically, the CPU 961 determines whether the position at which this line is to be changed over is a position at which a pixel was inserted or removed. When it is found in step S4 that this position does not coincide with the revised pixel position, control proceeds to step S5. In step S5, based upon the correction position and correction value that have been stored in the curvature characteristic memory 106, line data is selected by the curvature characteristic memory 106 and the result of calculation by the interpolation calculator 103 is output. Control then proceeds to step S2.

On the other hand, if it is found in step S4 that this position coincides with the revised pixel position, control proceeds to step S6. In step S6, the correction position and correction value that are output to the line selector 102 and interpolation calculator 103 are made the same as those in the case of the immediately preceding pixel. As a result, even in a case where scanning position of the beam at the present time corresponds to the line changeover position, the data of the same line as that of the immediately preceding pixel is output without changing over the line data. Then, in step S7, the next pixel position is set to the line-data changeover position and control proceeds to step S2.

Further, if it is found in step S3 that scanning position of the beam at the present time does not correspond to the line changeover position, then control proceeds to step S8, where it is determined whether this is the end of one line. If this is not the end of one line, control proceeds to step S5. In step S5, based upon the correction position and correction value that have been stored in the curvature characteristic memory 106, line data is selected by the line selector 102 and the result of calculation by the interpolation calculator 103 is output. When the end of one line is determined in step S8, this processing is terminated.

Next, processing relating to changeover of line data according to this embodiment will be described with reference to FIG. 10.

Figure 10:
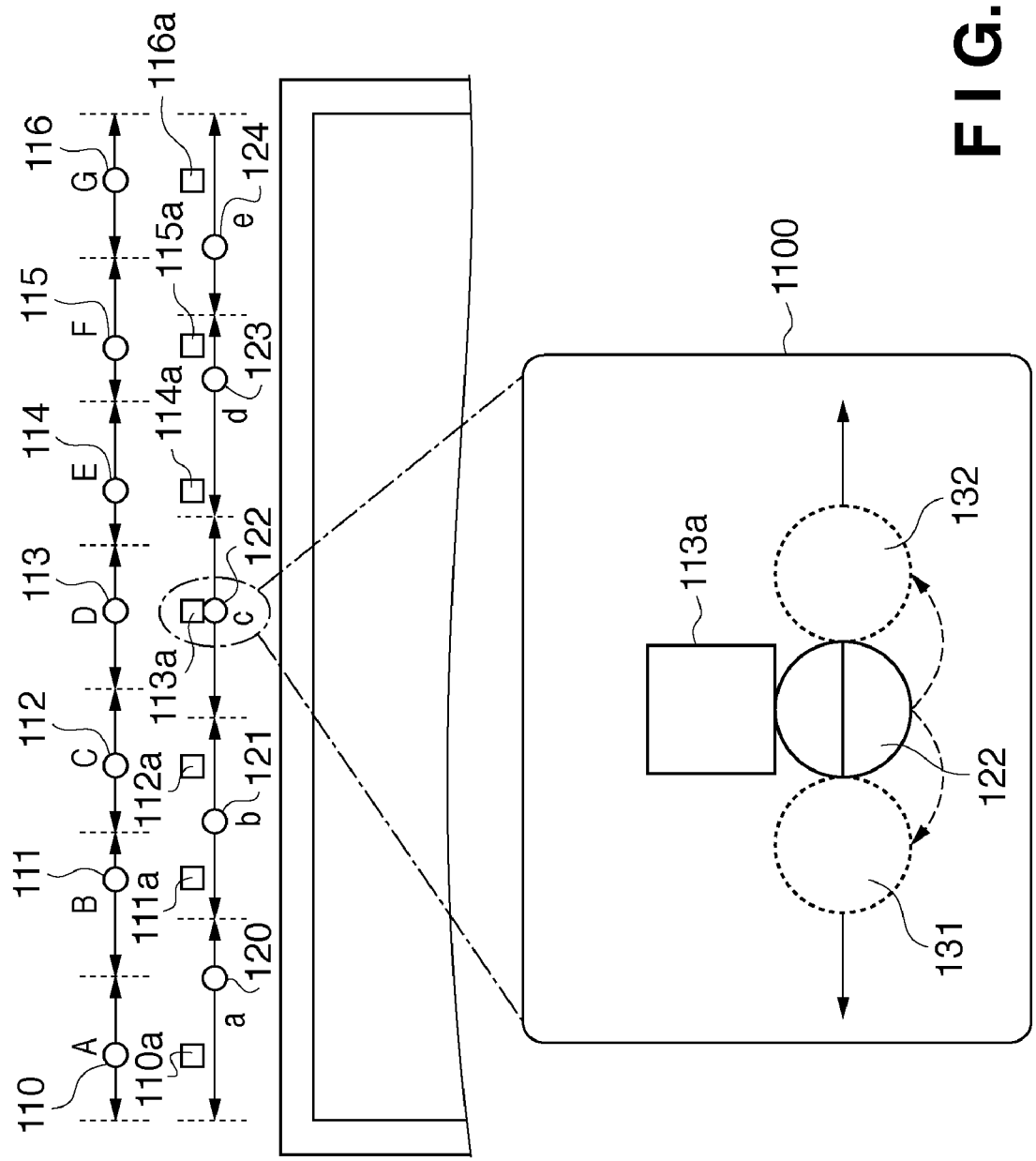
FIG. 10 is a diagram illustrating an example of the relationship between pixel-data insertion and removal positions and line-data changeover position according to this embodiment.

FIG. 10 is a diagram illustrating an example of the relationship between pixel-data insertion and removal positions and line-data changeover position according to this embodiment. The main scanning direction is assumed to be from left to right in FIG. 10.

In FIG. 10, reference numerals 110 to 116 denote positions (revised pixel positions) at which a pixel is inserted or removed by scaling of image data. Further, reference characters A to G indicate units of pixel data in which a pixel is inserted or removed, 110a to 116a represent correction control areas corresponding to the revised pixel positions 110 to 116, respectively, and 120 to 124 denote changeover points at which line data is changed over.

Further, reference numeral 1100 denotes an example in which, because changeover point 122 coincides with correction control area 113a, this changeover point is moved to the preceding or following pixel position in the main scanning direction, as indicated at 131 or 132. In the flowchart of FIG. 9, when the revised pixel position and the line-data changeover point coincide, this changeover point is moved to the immediately succeeding pixel position, as indicated by 132 in FIG. 10.

Figure 11:
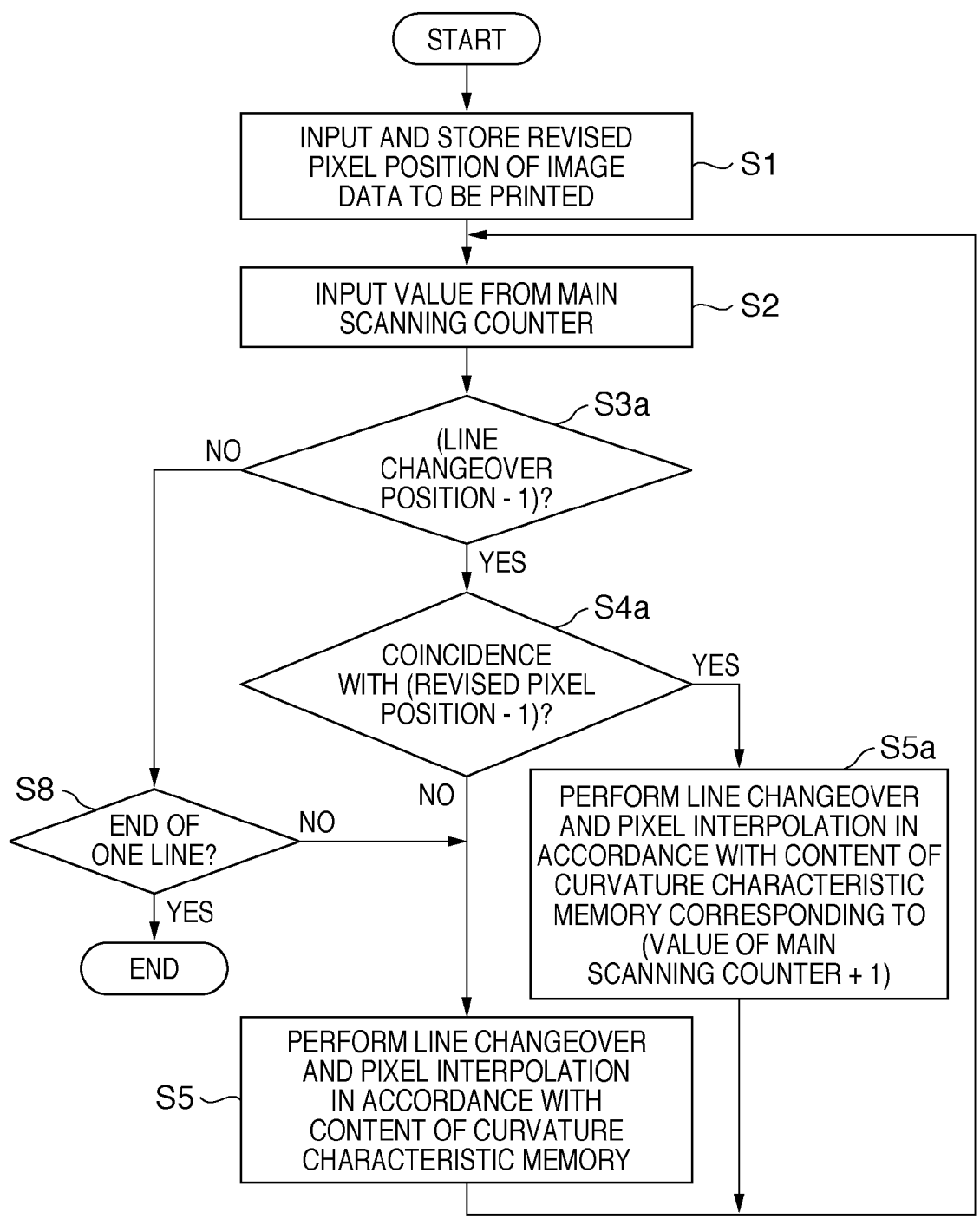
FIG. 11 is a flowchart illustrating processing in a case where a line-data changeover point is moved to an immediately preceding pixel position when a revised pixel position and the line-data changeover point coincide.

FIG. 11 is a flowchart illustrating processing in a case where a line-data changeover point is moved to an immediately preceding pixel position, as indicated by 131 in FIG. 10, when a revised pixel position and the line-data changeover point coincide. Steps similar to those of the flowchart of FIG. 9 are designated by like step numbers and need not be described again.

In step S2, information indicating the scanning position of the beam is acquired from the main scanning counter 105. Then, in step S3a, based upon (correction position−1) that has been stored in the curvature characteristic memory 106, it is determined whether the scanning position of the beam at the present time is the pixel position that immediately precedes the line changeover position. When the scanning position of the beam at the present time is the pixel position that immediately precedes the line changeover position, control proceeds to step S4a, where it is determined whether this position coincides with (revised pixel position−1). This is a determination as to whether the position at which the line is changed over coincides with the revised pixel position at a position one pixel before. When it is determined in step S4a that this position is not (revised pixel position—1), control proceeds to step S5. In step S5, based upon the correction position and correction value that have been stored in the curvature characteristic memory 106, line data is selected by the line selector 102 and the result of calculation by the interpolation calculator 103 is output. Control then proceeds to step S2.

On the other hand, when it is determined in step S4a that this position coincides (revised pixel position—1), control proceeds to step S5a. Here the correction position and correction value that are output to the line selector 102 and interpolation calculator 103 are made the same as those in the case of the immediately succeeding pixel. As a result, even if the actual scanning position of the beam at the present time is the immediately preceding line changeover position, the line data is changed over and the data of the line after the changeover is interpolated and output. As a result, even if the actual scanning position of the beam reaches the line changeover position next, line changeover will already have been completed and therefore the data of this line is interpolated and output.

In accordance with this embodiment, as described above, at a revised pixel position where a pixel has been revised in the main scanning direction, changeover of the line data is not performed and the line data is changed over ahead of or behind this revised pixel position. As a result, uniformity of thickness of fine lines is maintained and tone jump due to the revised pixel is suppressed. This means that an excellent image is obtained even if a scaling of image data is performed.

In the example set forth above, a case is described in which line data is changed over at a pixel position ahead of or behind the revised pixel position. However, it is also possible to adopt an arrangement in which line data is changed over at a position that is ahead of or behind the revised pixel position and, moreover, a plurality of pixels distant from this revised pixel position.

In this embodiment, a polygonal mirror is used as an optical scanning unit. However, the present invention is applicable also to a case where other scanning unit such as a galvanometer mirror or electro-optic element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-181443, filed Jul. 10, 2007, which is hereby incorporated by reference herein in its entirety.

What is claimed is:

1. An image forming apparatus comprising:
a scanning unit configured to be operable to simultaneously scan a plurality of lines of an image in a main scanning direction to thereby form an image of the plurality of lines;
a characteristic storage unit configured to store an error characteristic, in a sub-scanning direction with respect to an ideal scanning line, of a scanning line of the scanning unit in a main scanning direction thereof;
a storage unit configured to store a plurality of lines of image data;
a line selector configured to select a line of image data that is read out of the storage unit;
an interpolation unit configured to interpolate the image data of the line, which has been selected by the line selector and read out, in accordance with the error characteristic stored in the characteristic storage unit;
a unit configured to store a revised pixel position in the main scanning direction in the image data; and
a changeover control unit configured to change over the line of image data, which is selected by the line selector, in accordance with a scanning line changeover position in the main scanning direction, which is based upon the error characteristic stored in the characteristic storage unit, and the revised pixel position.

2. The apparatus according to claim 1, wherein in a case where the scanning line changeover position in the main scanning direction, which is based upon the error characteristic stored in the characteristic storage unit, and the revised pixel position coincide, the changeover control unit moves the line changeover position from the revised pixel position along the main scanning direction.

3. The apparatus according to claim 1, wherein in a case where the scanning line changeover position in the main scanning direction, which is based upon the error characteristic stored in the characteristic storage unit, and the revised pixel position coincide, the changeover control unit moves the line changeover position from the revised pixel position along a direction that is opposite the main scanning direction.

4. The apparatus according to claim 1, wherein the error characteristic is represented by an amount of deviation, in the sub-scanning direction with respect to the ideal scanning line in the main scanning direction, at each scanning position in the main scanning direction of the scanning unit.

5. The apparatus according to claim 1, wherein the interpolation unit holds a plurality of lines of image data and interpolates pixel data using neighboring line of image data in accordance with the error characteristic.

6. A method of controlling an image forming apparatus having a scanning unit configured to be operable to simultaneously scan a plurality of lines of an image in a main scanning direction to thereby form an image of the plurality of lines and a characteristic storage unit for storing an error characteristic, in a sub-scanning direction with respect to an ideal scanning line, of a scanning line of the scanning unit in the main scanning direction thereof, the method comprising:
a line selecting step of selecting a line of image data that is read out of a memory that stores a plurality of lines of image data;
an interpolation step of interpolating the image data of the line, which has been selected and read out in the line selecting step, in accordance with the error characteristic;
a storage step of storing a revised pixel position in the main scanning direction in the image data; and
a step of determining a scanning line changeover position changing over the line of image data in the main scanning direction, based on the error characteristic stored in the characteristic storage unit;
a changeover control unit step of changing over the line of image data, which is selected in the line selecting step, in accordance with the scanning line changeover position and the revised pixel position.

7. The method according to claim 6, wherein in a case where the scanning line changeover position in the main scanning direction, which is based upon the error characteristic, and the revised pixel position coincide, the line changeover position is moved from the revised pixel position along the main scanning direction in the changeover control step.

8. The method according to claim 6, wherein in a case where the scanning line changeover position in the main scanning direction, which is based upon the error characteristic, and the revised pixel position coincide, the line changeover position is moved from the revised pixel position along a direction that is opposite the main scanning direction in the changeover control step.

9. The method according to claim 6, wherein the error characteristic is represented by an amount of deviation, in the sub-scanning direction with respect to the ideal scanning line in the main scanning direction, at each scanning position in the main scanning direction of the scanning unit.

10. The method according to claim 6, wherein in the interpolation step, a plurality of lines of image data are held and pixel data is interpolated using neighboring line data in accordance with the error characteristic.

* * * * *